United States Patent

[11] 3,590,573

[72] Inventor Jacques Dietsch
Paris, France
[21] Appl. No. 799,648
[22] Filed Feb. 17, 1969
[45] Patented July 6, 1971
[73] Assignee Societe Anonyme des Etablissements Leon Hatot
Paris, France
[32] Priority Feb. 19, 1968
[33] France
[31] 140350

[54] SYSTEM FOR SYNCHRONISING TIMING DEVICES
15 Claims, 12 Drawing Figs.

[52] U.S. Cl. .......... 58/24, 58/28, 58/33, 318/127
[51] Int. Cl. .......... G04c 3/04
[50] Field of Search .......... 58/23, 24, 28, 26, 33, 35; 331/172

*Primary Examiner*—Richard B. Wilkinson
*Assistant Examiner*—Edith C. Simmons
*Attorney*—Robert E. Burns

ABSTRACT: Pulse signals from a radio receiver are applied to a synchronizing winding to synchronize the pendulum, balance wheel or other mechanical oscillator of a timing device, and a transistor-switching device controlled by a pickup operated by the said mechanical oscillator is electrically connected to prevent the energization of the synchronizing winding except when the mechanical oscillator is within a predetermined limited range of positions, so as to eliminate parasitic noise signals received during the remaining time.

SYSTEM FOR SYNCHRONISING TIMING DEVICES

In time measurement, the period of rotation or vibration of a mechanical oscillator, such as the pendulum, balance wheel, tuning fork or other vibrating-balance member of a clock, referred to herein as the mechanical oscillator, is conventionally synchronized by means of electric synchronizing signals emitted by a high-precision master clock. More particularly, a master clock transmitting periodic synchronizing signals can be used to synchronize a system oscillating in the harmonic, superharmonic or subharmonic mode, in relation to the period of the reference signals.

Many installations of this kind have been constructed in which the master clock was connected to synchronize slave clocks by electric cables. If the moving system to be synchronized comprises in its construction a moving magnetic unit, or can be provided with such a unit, it can readily be synchronized by means of a synchronizing coil through which an electric-synchronizing current coming from the master clock periodically flows, the flow of current in the synchronizing coil, which behaves like an electromagnet, periodically supplying a synchronizing pulse to the magnetic unit.

It has also been suggested for many years to perform wireless synchronization by radio. Hitherto this kind of synchronization had not been practicable, since there was no regular radio time service transmitting periodic reference signals capable of being used for the whole 24 hours of the day. Now this service has been provided by the construction of a transmitting station at Prangins, Switzerland. This transmitter transmits on a carrier frequency of 75 kHz. 1 pulse per second by suppression of the carrier wave for 0.1 second at a repetition frequency of 1 per second, the carrier wave and the signals being controlled by a very high-precision atomic clock. Signals from Prangins can be picked up in almost the whole of Europe and in North Africa.

By using a receiver tuned to the Prangins transmitter, therefore, an electric output signal can be obtained which is theoretically adapted to be applied to a synchronizing winding, or to certain precise points of a maintenance circuit for an electric or electronic clock, to act as a synchronizing signal therefor. However, practical tests carried out by the applicants have shown that the reception of the reference radio signals and their reproduction in the form of synchronizing signals require very special precautions to avoid serious disturbances caused by industrial or atmospheric parasitic signals, anomalies in the propagation of the waves, risks of interference, stoppages of the transmitter, etc.

To this end according to the present invention a system for synchronizing the mechanical oscillator of a timing device, includes a radio receiver for receiving a periodic radio-synchronizing signal, and at least one synchronizing winding, acting on the oscillator to synchronize it and connected to the output of the receiver so as to be energized by an electrical synchronizing signal initiated by the radio-synchronizing signal, characterized by a switching device preferably of semiconductor type, controlled by the oscillator and electrically connected to prevent the energization of the synchronizing winding except when the frequency control member is within a predetermined limited range of positions in which the synchronizing signal will be effective and which corresponds to a small fraction of the repetition period of the synchronizing signal.

The duration for which the synchronizing winding can be energized can be optionally equal to, or greater or smaller than the actual duration of the synchronizing signal. Thus, when synchronization has been achieved, the synchronizing device according to the invention can be actually energized only at precisely determined instants corresponding exactly to the transmission of the reference time signal, so that any parasitic signals in the intervals of transmission of the reference signals cause no disturbances in the system.

The switching device may be connected in the circuit of the synchronizing winding or in a stage of the receiver between its input and output, for example in preamplifying stage, or in series with the power supply to the receiver. In the latter case the receiver will only be consuming power for brief periods corresponding to the actual pulses of the synchronizing signals; hence in addition to affording protection against parasitic noise the arrangement results in considerable saving of electric power. The switching device may be influenced by the oscillator in various ways, for example by an electromagnetic pickup or even by a contact directly actuated by the oscillator.

Other forms of pickup may also be employed, for example a Hall-effect probe, a magnetoresistance, a proximity detector or a photoelectric cell.

The oscillator may also take various forms. Where it comprises a balance member provided with an electromagnetic-sustaining system including a pickup controlling pulses of energization to a driving coil, as described in U.S. Pat. No. 3,168,690 the synchronizing signal may be applied to the self-sustaining system, either to the driving coil or to the pickup or to both.

In addition to the switching device controlled by the frequency control member the system may also include a specifically improved form of antiparasitic-filtering circuit. Thus in one arrangement the synchronizing signal is passed through an antiparasitic-filtering circuit, including a capacitor in parallel with a resistor and in series with a further resistor connected between the input and output of the filtering circuit and a capacitor in parallel with a resistor connected across the input of the filtering circuit. Conveniently the output of the filtering circuit is connected between the base and emitter of a transistor which are also shunted by a resistor, whilst the emitter/collector path of the transistor is connected in series with the synchronizing winding to a supply.

The invention may be put into practice in various ways but certain specific embodiments will be described by way of example with reference to the accompanying drawings in which.

Figure 5A:
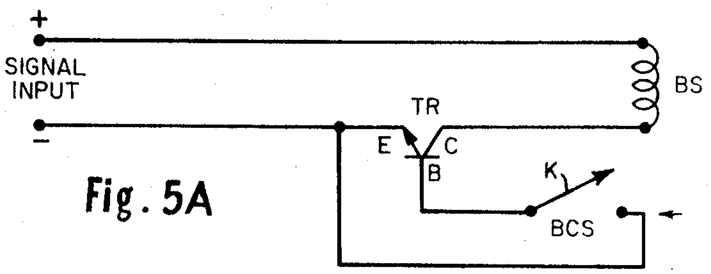
Figure 5:
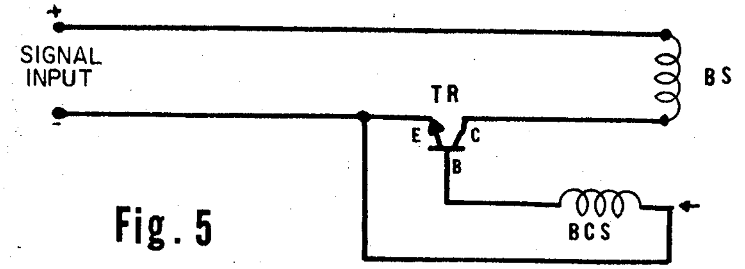
Figure 6:
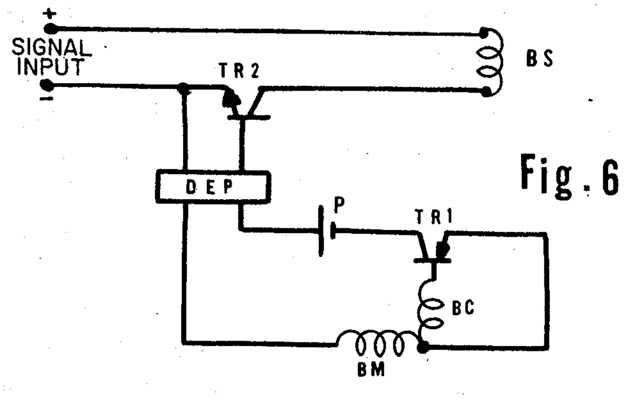
Figure 7:
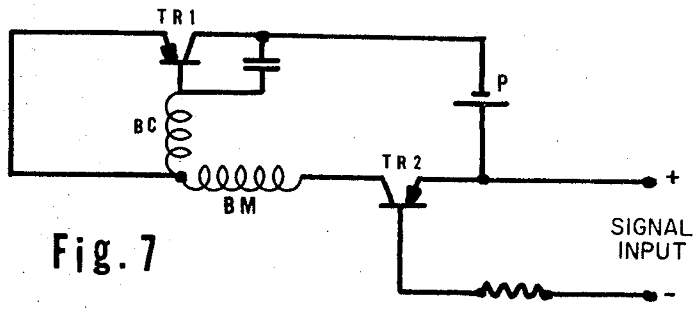
Figure 8:
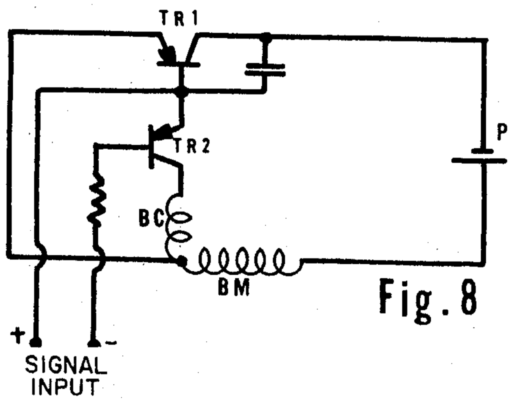
Figure 9:
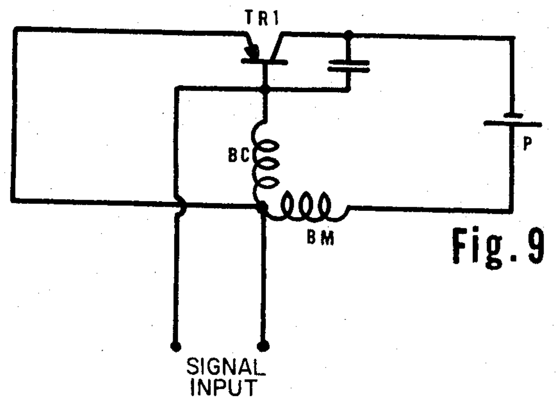
Figure 10:
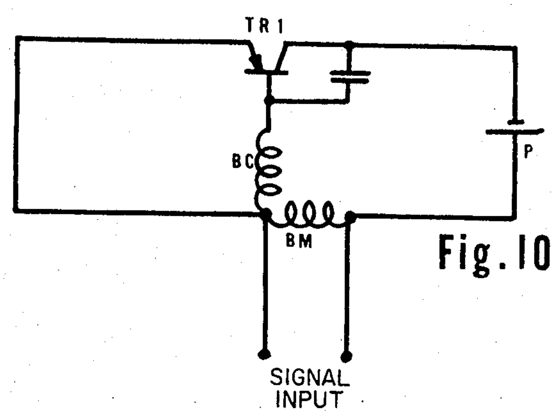
Figure 11:
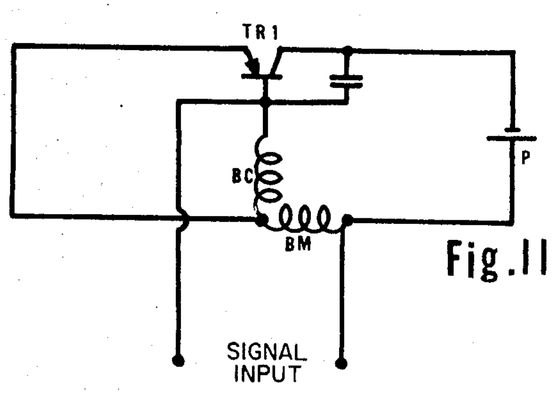

FIGS. 5, 5A, and 6 are diagrams of embodiments of the electronic gates forming the switching devices;

FIGS. 7 and 8 are diagrams illustrating installations in which the synchronizing signal is applied to self-maintaining circuits, and FIGS. 9 to 11 are diagrams of further arrangements.

Figure 1:
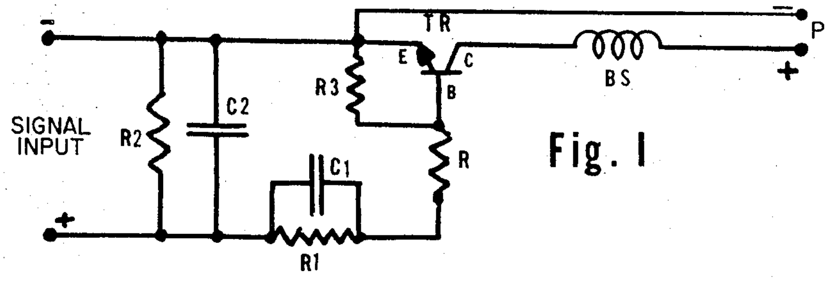
FIG. 1 is a circuit diagram of an improved antiparasitic circuit, forming a secondary feature of the invention, for the selective feeding of a synchronizing winding.

FIG. 1 diagrammatically illustrates a circuit for the selective elimination of parasitic signals leaving the final amplifying stage of the radio receiver and feeding a synchronizing coil BS. The circuit is formed by a transistor TR, preferably a silicon PNP or NPN transistor, in the collector circuit of which a synchronizing coil BS is connected in series with a DC source P. The radio signal is applied to the base-emitter circuit of the transistor TR through a capacitor $C_1$ in parallel with a resistor $R_1$, both in series with a resistor R. A capacitor $C_2$ and a resistor $R_2$ are connected to the signal input terminals and a resistor $R_3$ is connected between the base and the emitter of the transistor TR.

Current flows from the positive signal input terminal from the base to the emitter (in case of an NPN transistor) and to the negative signal input terminal. The valves of the capacitor $C_1$ and resistor $R_1$ and R are so chosen that the charging time of the capacitor $C_1$ is of the order of magnitude of the duration of the reference radio signal, and its discharge time is of the order of magnitude of the time remaining between the end of the signal and the following signal. Thus all the parasitic signals arriving outside the duration of the reference signal are ineffective. The resistor $R_3$ allows a base bias producing peak clipping and preventing the action of signals of excessively low amplitude. The capacitor $C_2$ and the resistor $R_2$ bypass both the continuous component and high-frequency components of a parasitic signal. Thus, any signal which has an inadequate amplitude or is produced at the wrong time, or is too short or too long, is absorbed by the elements in the input circuit and is, therefore, not reproduced in the synchronizing coil BS.

In practice, the antiparasitic circuit shown in FIG. 1 is insufficient to completely suppress the effect of parasitic signals acting outside the synchronizing times. According to the invention, the installation is, therefore, substantially improved by using the period of the clock oscillator or regulator and suitable switching means to completely prevent the arrival of signals outside these particular instants.

Figure 2:
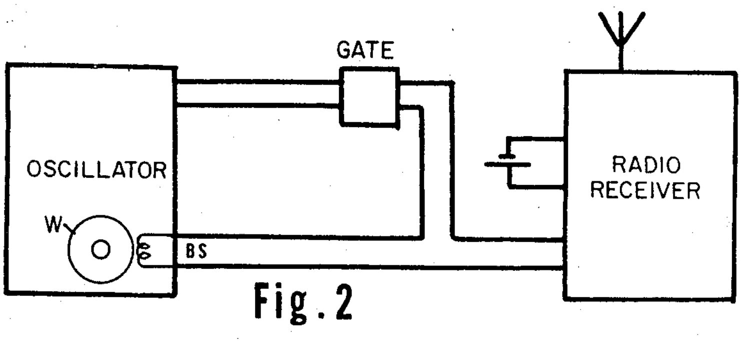
FIGS. 2 to 4 are diagrams respectively of three embodiments of the synchronizing apparatus according to the invention.
Figure 3:
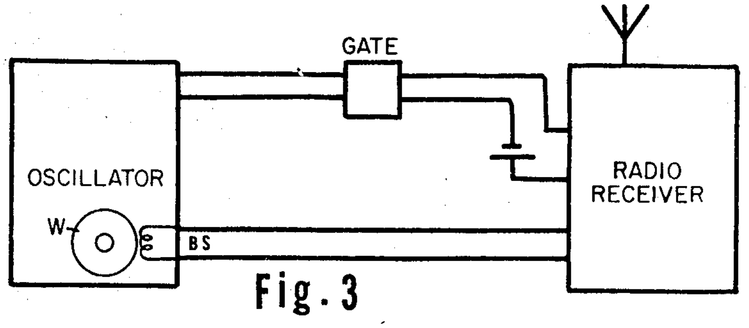
Figure 4:
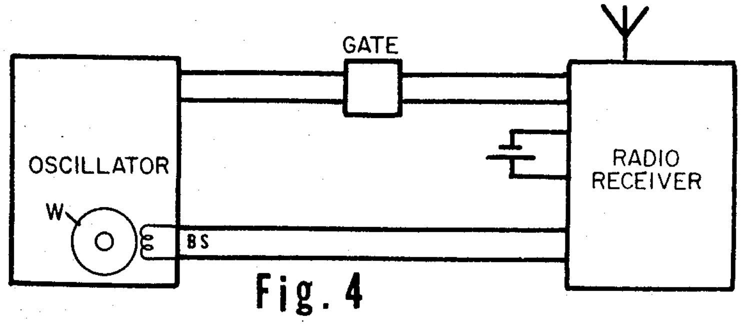

FIGS. 2 to 4 show diagrammatically the use of electronic gates forming switching devices and controlled by the oscillator or regulator. These figures show diagrammatically the radio receiver, the oscillator forming the clock regulator, its synchronizing coil BS and an electronic gate. The oscillator has an oscillating or vibrating balance member shown schematically as a balance wheel W.

In FIG. 2, the electronic gate, which is controlled by the oscillator, is connected directly in series with the synchronizing coil and periodically breaks its circuit.

In FIG. 3, the electronic gate is in series with the power supply to the receiver.

In FIG. 4, the electronic gate is included in a stage of the receiver, for instance, either the preamplifying stage or the output stage.

In addition to having the advantage of completely eliminating the parasitic signals outside the predetermined moments of synchronizing action, these latter methods allow a varying amount of saving in the amount of electrical energy used by the receiver, since the receiver needs to be operative only during a fraction of the time, corresponding to the relative duration of the synchronizing pulse. For instance, in the present state of Prangins transmissions, the synchronizing pip lasting 0.1 second every second, the amount of power absorbed can be reduced by 90 percent, and, therefore, the self-contained operation of the receiving station can be increased in the converse ratio.

FIG. 5 shows a possible embodiment of an electronic gate. This circuit is formed by a transistor TR, of NPN (or PNP) type, to whose collector circuit there is connected a synchronizing coil BS, in series with the radio signal coming from the receiver. Connected to the base-emitter circuit is a synchronization control coil BCS connected, for instance magnetically, to the clock-regulating member which, to simplify the explanation, will hereinafter be considered to be a driving or self-sustaining balance member (balance wheel or pendulum) of the kind associated with a magnetic unit.

The position of the coil BCS in relation to the travel of the balance member can be selected as required, so that the action of the synchronizing coil BS is as efficient as possible.

In operation electromotive forces of the same frequency as that of the balance member are induced in the coil BCS and can therefore make the transistor TR conductive, only for a time corresponding to a fraction of the travel of the balance member which can be greater than, equal to or less than the synchronizing signal, and it is only during this time that the actual synchronizing signal takes place.

Instead of the synchronization control coil BCS, it is possible to use any pickup device, such as Hall-effect probes, magnetoresistances, or, more particularly if the balance member is not a driving-balance member with a magnetic unit, photoelectric cells, proximity detectors or even electric contacts etc.

FIG. 5A illustrates by way of example a circuit which is like that of FIG. 5 except that the synchronization control coil BCS is replaced by electric contacts K.

FIG. 6 diagrammatically illustrates a further embodiment of an electronic gate controlled by the movement of a clock balance member. The base-emitter input circuit of the gate transistor $TR_2$ is controlled by the self-maintaining pulses of clockwork maintained by the transistor $TR_1$, the coils BC and BM, and the feed source P, in a known assembly, disclosed in the previously cited patent.

An auxiliary dephasing circuit DEP can be connected to the input circuit of the transistor $TR_2$, to determine the most favourable moment for the action of the synchronizing pulses.

FIGS. 7 and 8 show further embodiments of an electronic gate, which is triggered by the radio signals and controls the self-maintaining circuit of the clockwork, either via the drive coil BM (FIG. 7) or the control coil BC (FIG. 8). For the assembly to operate correctly, the self-maintaining pulses must be in phase with the signals delivered by the radio receiver.

FIGS. 9 to 11 show various possible circuits for applying the synchronizing pulses without using an auxiliary coil, in the case of a driving-balance member of the kind disclosed in the aforementioned patent.

In FIG. 9 the radio signals are applied to the terminals of the control coil BC of the self-maintaining circuit formed by the transistor $TR_1$, the drive coil BM and the feed source P. Depending on the polarity of the signal applied to the coil BC, two different effects can be produced, i.e. either a direct electromagnetic effect caused by the coil BC, or an electromagnetic effect caused by the drive coil BM when the radio signal unblocks the transistor $TR_1$.

In FIG. 10 the radio signals are applied to the drive coil BM and can thus be superimposed on the self-maintaining pulses. In this case also the synchronizing effects can differ, since they can be added to, or subtracted from, the self-maintaining pulses, depending on the polarity of the signal applied.

In FIG. 11 the radio signals are applied conjointly to the control coil BC and the drive coil BM. As in FIGS. 9 and 10, the synchronizing effects can be different, depending on the polarity of the radio signals applied to the circuit.

In all the embodiments mentioned above, clearly a circuit of the type shown in FIG. 1 can advantageously be interposed between the output of the radio receiver and the coils controlled.

Of course, the present invention is not limited to the embodiments described, but covers all variants within the scope of the invention. More particularly, it must be understood that the synchronization according to the invention can be applied to any type of clock with or without a driving-balance member, but on condition that the necessary elements are adapted to it, such as a magnetic unit on the balance member, or, conversely, a fixed magnetic unit cooperating with moving coils mounted on the balance member. It is also possible to use known techniques to reduce or eliminate certain harmful parasitic effects. For instance, univibrator, multivibrator, blocking, trigger circuits, etc. can be interposed at certain levels in the receiving system.

The invention can be applied to all kinds of synchronizing signals, and is not limited to the example of the Prangins transmitter.

In the foregoing description only the synchronizing effect of an oscillating member has been considered, but the signals received can also be used to regulate rotary motors whose speed would already be substantially stabilized. The reason is that the synchronizing signals can produce an electromagnetic effect—either a braking or accelerating effect, in dependence on the time at which they are operative, so that they enable the speed of rotation of a motor to be precisely stabilized. The synchronizing action can then be performed either directly on the rotor if the speed is slow enough, or on a stepped-down shaft, in dependence on the electric or electronic circuit of the motor.

The synchronizing signals can also advantageously be transmitted by artificial satellites, for instance three stationary satellites. Lastly, it should be understood that the term "-clock" used above must be understood in its widest generic sense, to mean fixed or portable time-measuring apparatuses, including *inter alia* watches.

What I claim as my invention and desire to secure by Letters Patent is:

1. A system for synchronizing a timing device having a mechanical oscillator including an oscillating member, said system including a radio receiver for receiving a periodic radio-synchronizing signal comprising synchronizing pulses corresponding to a fraction of the repetition period of said signal, and at least one synchronizing winding acting on the oscillator to synchronize it and connected to the output of the receiver so as to be energized by an electrical-synchronizing signal initiated by the radio-synchronizing signal, in which a switching device controlled by the oscillator is electrically connected in the circuit of said radio receiver to prevent the energization of the synchronizing winding by said radio receiver except for a fraction of the repetition period of said signal when the said oscillating member is within a predetermined limited range of positions in which the synchronizing pulses will be effective whereby the adverse effect of any parasitic signal received between said pulses is completely eliminated.

2. A system as claimed in claim 1 in which the switching device is of semiconductor type.

3. A system as claimed in claim 1 in which the switching device is connected in the circuit of the synchronizing winding.

4. A system as claimed in claim 1 in which the switching device is connected in a stage of the receiver between its input and output.

5. A system as claimed in claim 1 in which the switching device is connected in series with the power supply to the receiver.

6. A system as claimed in claim 1 in which the switching device is controlled by an electromagnetic induction pickup.

7. A system as claimed in claim 1 in which the switching device is controlled by a contact directly actuated by the mechanical oscillator.

8. A system as claimed in claim 1 in which the oscillator comprises a vibrating-balance member.

9. A system as claimed in claim 8 in which the oscillator comprises self-sustaining vibrating-balance member.

10. A system as claimed in claim 9 in which the vibrating-balance member is provided with an electromagnetic sustaining system including a driving coil and a pickup controlling pulses of energization to the driving coil, in which the synchronizing signal is applied to the self-sustaining system.

11. A system as claimed in claim 10 in which the synchronizing signal is applied to the driving coil.

12. A system as claimed in claim 10 in which the synchronizing signal is applied to the pickup.

13. A system as claimed in claim 1 in which the synchronizing signal is passed through an antiparasitic-filtering circuit, including a capacitor in parallel with a resistor and in series with a further resistor connected between the input and output of the filtering circuit and a capacitor in parallel with a resistor connected across the input of the filtering circuit.

14. A system as claimed in claim 13 in which the output of the filtering circuit is connected between the base and emitter of a transistor which are also shunted by a resistor, whilst the emitter/collector path of the transistor is connected in series with the synchronizing winding to a supply.

15. A system as claimed in claim 16 which is adapted to respond to a radio-synchronizing signal comprising pulses emitted at a carrier frequency of several tens of kHz. by suppressing the carrier wave for a fraction of a second at a pulse repetition frequency of 1 second.